Nov. 12, 1963      A. J. HIPP      3,110,622

METHOD OF MAKING FUEL CELL ELECTRODES AND THE LIKE

Original Filed June 28, 1960      3 Sheets-Sheet 1

Inventor
Allen J. Hipp
by Richard R. Mybeck
Attorney

Nov. 12, 1963 A. J. HIPP 3,110,622
METHOD OF MAKING FUEL CELL ELECTRODES AND THE LIKE
Original Filed June 28, 1960 3 Sheets-Sheet 3

Inventor
Allen J. Hipp
by Richard R. Mybeck
Attorney 3,110,622
METHOD OF MAKING FUEL CELL ELECTRODES AND THE LIKE
Allen J. Hipp, Wauwatosa, Wis., assignor to Allis-Chalmers Manufacturing Company, Milwaukee, Wis.
Original application June 28, 1960, Ser. No. 39,345. Divided and this application May 26, 1961, Ser. No. 112,903
5 Claims. (Cl. 117—227)

This invention relates generally to the manufacture of fuel cell electrodes and the like and more particularly to improved methods for applying a catalytic concentration upon electrically conductive base materials to provide electrodes for use in fuel cells.

"Fuel cells," as that term is herein used, defines those devices which convert chemical energy directly into electrical energy and are more fully described in my co-pending application Serial No. 39,345, filed June 28, 1960, from which this is a division.

Briefly stated, a fuel cell essentially comprises (1) means for containing a preselected chemical reaction of the type in which the reactants separately possess more energy than the product they form, and (2) means for capturing the "excess" energy formed by the reaction as electrical energy.

As presently constructed, a fuel cell (and for ease of explanation, a single cell will be considered) comprises a housing into which are mounted two porous electrically conductive electrodes separated by an electrolyte. In the present description, a hydrogen-oxygen cell shall be used to exemplify the present invention, but not to limit it. In the hydrogen-oxygen fuel cells, a most satisfactory electrolyte is found among the hydroxides of the alkali metals such, for example, as sodium hydroxide, potassium hydroxide and the like.

At one side of the cell, when it is conditioned for operation, hydrogen gas is fed into the space between one of the electrodes and the housing. The gas diffuses through this electrode (herein called the "negative" electrode) whereupon each hydrogen molecule ($H_2$) is adsorbed on the surface of the electrode in the form of two hydrogen atoms (2H).

The hydrogen atoms (H) then react with hydroxyl ions ($OH^-$) present in the electrolyte to form water and in so doing, free the electron ($e^-$) from the hydroxyl ion to the negative electrode by this reaction, (1) $\quad 2H + 2OH^- \rightarrow 2H_2O + 2e^-$ An external path is provided which connects the negative electrode with the second electrode (herein called the "positive" electrode) at the other side of the cell. The flow of electrons, deposited upon the negative electrode in the manner indicated, through the external path to the positive electrode is an electric current which can be put to work.

Further, the flow of the electrons through the external path provided between the electrodes, while constituting the electrical output of the cell, also provides support to the oxygen half of the reaction, as will now be explained.

On the positive side of the cell, oxygen gas ($O_2$) is fed into the space between the electrode and the housing. The oxygen gas diffuses through the electrode and is adsorbed on the electrode surface.

Then, by a somewhat circuitous reaction, the adsorbed oxygen ($O_2$), the incoming electrons ($e^-$) and the water in the electrolyte react to form hydroxyl ions ($OH^-$) according to the following reaction:

(2) $\quad \frac{1}{2}O_2 + H_2O + 2e^- \rightarrow 2OH^-$

The hydroxyl ions thus formed complete the cycle by migrating through the electrolyte to the negative electrode.

The total reaction within the fuel cell system becomes the sum of the zone reactions indicated at (1) and (2) above and is:

(3) $\quad 2H + 2OH^- + \frac{1}{2}O_2 + H_2O + 2e^- \rightarrow 2H_2O + 2e^- + 2OH^-$ Clearing the equation, we return to:

(4) $\quad 2H + \frac{1}{2}O_2 \rightarrow H_2O$

While efficiency of energy transformation is of extreme importance to the advent of a practical fuel cell, there are other factors which must also be considered before a fuel cell is to enter a competitive market.

One extremely important factor is the length of time a cell can operate with good current densities and constant voltage before its performance falls off due to, inter alia, the deterioration of the electrode.

It is toward this latter consideration, viz., the enhancement of the current characteristics at constant voltage and prolongation of the operative life of the fuel cells through enhancement of electrode properties that the present invention is generally directed.

The present invention, is designed to provide an extremely efficient easily prepared electrode for use in a fuel cell which is operative at low temperatures and under atmospheric pressure conditions and which, simultaneously, obtains commercially practicable power outputs. More particularly, as is described in my aforementioned co-pending application, I have devised a simple self-contained fuel cell unit which is operative without the extremely severe operating conditions and complex equipment characteristic of the Bacon type cell.

To eliminate the high pressures and high temperatures of Bacon, one approach deemed desirable involves the consideration that the reaction of the gases, from which the electric current is created, be activated by a suitable catalyst so that a current density and voltage output of a significantly practical level may be obtained at ambient temperatures.

A major problem in the low temperature catalyst-activated fuel cell is obtaining an electrode which delivers the maximum amount of current per unit of electrode area at a constant voltage. And hence, we face the specific problem which the present invention solves.

The present invention is predicated upon our discovery that the strategic deposition of special applications of catalytic compositions upon a plaque formed of porous nickel and the like, provides, for use in fuel cells and like apparatus, an electrode which is mechanically stable, chemically resistant to attack by fuel cell electrolyte, provides a maximum surface for deposition of catalyst, maximum accessibility to the catalytic surface for both the electrolyte and the reactant gases, which can be utilized either as an anode, a cathode or both and which, in action, delivers a high current density per unit of surface area at a constant voltage for a remarkably unexpected length of time.

Accordingly, one of the prime objects of the present invention is to provide an improved method for making an electrode for use in a fuel cell which operates at atmospheric pressure and ambient temperature to obtain a high efficiency and high power output.

It is another object of the present invention to provide an improved method for making an electrode for fuel cells which may be employed as either a positive or a negative electrode or both within a fuel cell operable at room temperature and atmospheric pressure.

Still another object of the present invention is to provide a method of manufacturing improved electrodes for low-temperature, low-pressure fuel cells in which a plurality of applications of special catalytic compositions, in and on an electrode plaque, obtain an unexpectedly remarkable catalytic action in the operation of a fuel cell.

An even further object of the present invention is to provide an improved method of forming an electrode for low pressure ambient temperature fuel cells in which catalyst is strategically disposed upon an electrode plaque and obtains therewith a bond of remarkable tenacity.

A still further object of the present invention is to provide an improved method of forming an electrode for fuel cells whereby an enhanced effective surface area is realized having its maximum catalyst concentration at the situs of maximum utility.

A still further object of the present invention is to provide an improved method of preparing electrodes for use in a fuel cell which is capable of delivering high current densities at constant voltage at ambient temperatures and eliminates the necessity of heating the cell and greatly reduces heat losses occurring between the heated cell and its relatively cooler environs.

Still another object of the present invention is to provide an improved method of producing electrodes for use in fuel cells and like apparatus in which a porous plaque is treated with sequential application of catalytic compositions to provide essentially monomolecular catalytic concentrations intermittently at the situs of maximum utility whereby the gas adsorptive characteristic of the electrode is enhanced greatly in excess of electrodes bearing an equal amount of catalyst deposed by a single application.

It is still another object of the present invention to provide an improved method of making an electrode for a low temperature catalyst activated fuel cell, which electrode develops remarkably enhanced current densities per unit area of surface while maintaining a constant voltage.

It is still another object of the present invention to provide a method for making an improved fuel cell electrode which is mechanically stable, nonbrittle, resistant to shock, chemically resistant to attack by fuel cell electrolyte and possesses a relatively large catalytic surface which is readily accessible to both electrolyte and reactant gases.

Another object of the present invention is to provide a new method of catalyzing porous nickel plaques in which the plaque is successively immersed in a plurality of baths having the synergistic propensity of catalyzing random portions of the plaque surface and thereafter etching other portions thereof to produce new active centers for the acceptance of additional catalyst from subsequent baths.

These and still further objects, as shall hereinafter appear, are readily fulfilled by the present invention in a remarkably unexpected fashion as shall be discerned from the following detailed description of methods and electrodes exemplifying the present invention. Further, the complete significance and scope of the advance of the present disclosure will be further enhanced when the foregoing is considered in conjunction with the accompanying drawing in which.

Figure 1:
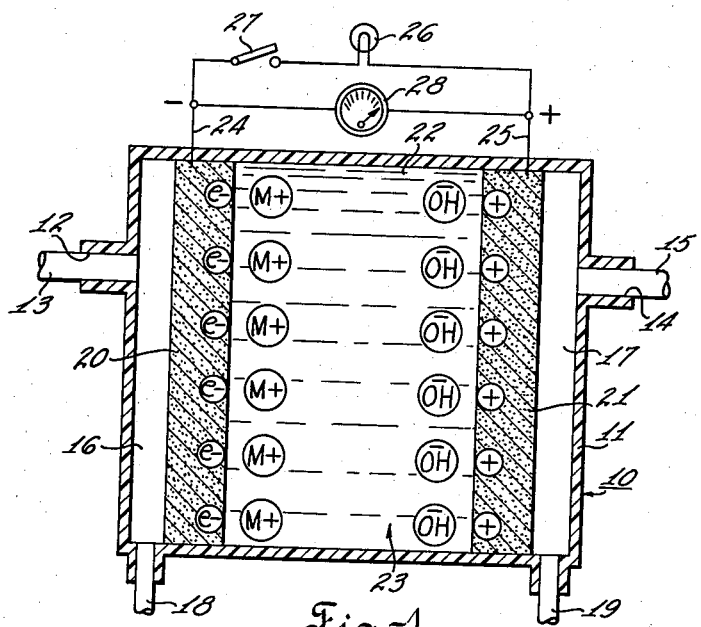
FIG. 1 is a schematic showing of a fuel cell under "no load" conditions.

Referring now to FIG. 1 of the drawing, a fuel cell of the type which may employ the present invention is indicated by the general reference number 10.

Fuel cell 10 comprises a housing 11 having a gas inlet means 12 defined in the left (relative to the drawing) side wall thereof connecting the fuel cell, by means of a suitable connecting tube 13, with a source (not shown) of a suitable gaseous fuel such, for example, as hydrogen or the electrochemically reactive hydrogen compounds such as the aliphatic hydrocarbons, methane, ethane, propane and the like.

Second gas inlet means 14 is similarly defined in the opposed or right (relative to the drawing) side wall thereof for connecting the fuel cell, by means of a suitable connecting tube 15, with a source (not shown) of a suitable oxidant for which oxygen, the most common, will be considered illustrative.

Gas inlet means 12 and 14 respectively feed gas spaces 16 and 17 defined within the housing in a manner to be hereinafter more fully described. Each gas space, 16 and 17, is respectively provided with outlet means 18, 19 at the bottom thereof for trapping and discharging condensate therefrom as shall also be more fully described.

Disposed within housing 11 and in spaced relationship to each other are first and second electrode members 20, 21 which coact with each other and housing 11 to define therebetween a chamber 22 which, when the cell is prepared for operation, is filled with the suitable electrolyte 23. Electrodes 20, 21 further provide the inner wall for gas spaces 16, 17, respectively. The preparation of these electrodes in accordance with the present invention shall be hereinafter fully described.

Extending out from housing 11 are a pair of electrical leads 24, 25. Lead 24 is connected to electrode 20, while lead 25 is connected to electrode 21. To form a complete circuit, lead 25 extends to and is connected through a suitable load, exemplified by lamp 26, to one terminal of a conventional "off-on" switch 27 while lead 24 is connected to another terminal of switch 27.

In order to determine the electrical characteristics of the circuit thus established, a suitable electrical meter, such as voltmeter 28, may be connected in parallel across the circuit.

FIG. 1 represents a "no load" condition inasmuch as switch 27 is open and the circuit through the load is broken. Under this condition, the ionic action within the cell is represented as dormant.

Figure 2:
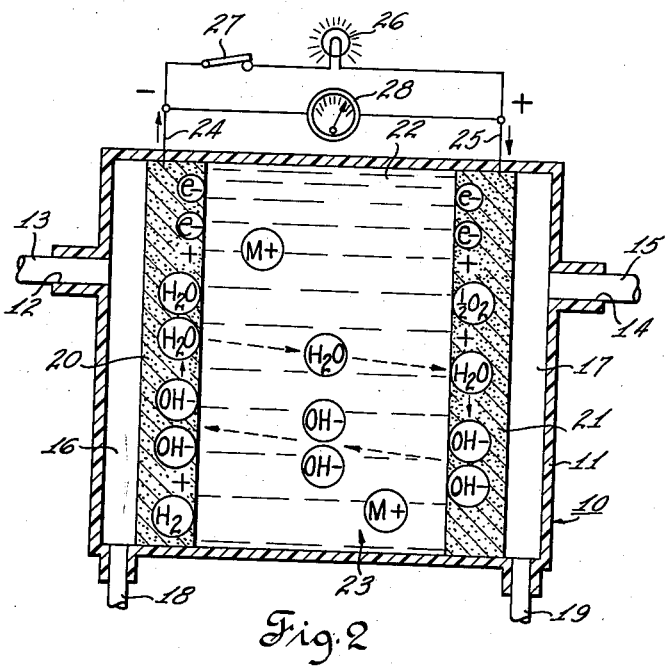
FIG. 2 is a schematic showing of the fuel cell of FIG. 1 under "full load" conditions.

In FIG. 2 the cell of FIG. 1 is shown when switch 27 is closed thereby completing the circuit and establishing a flow of electrons from electrode 20 (hereinafter referred to as "negative electrode") through load 26 to electrode 21 (hereinafter referred to as the "positive electrode").

FIG. 2 schematically shows the relative action of the various ions and molecules during the operation of the cell. It is, of course, understood that for purposes of this description, the illustrations of the cells and the ions, electrons, etc., depicted therewith, are predominantly schematic and are shown merely to exemplify the mechanics of the cell rather than to accurately reproduce either the quantities or the actual positions of the elements at any given instant.

The present invention is primarily concerned with improved electrodes for use in fuel cells and, more particularly, to the manufacture of such electrodes.

Figure 3:
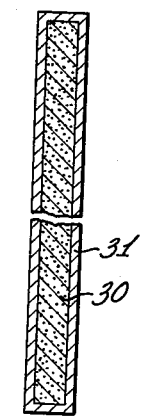
FIG. 3 is a cross sectional schematic showing of a fuel cell electrode treated in accordance with the present invention.

Referring to FIG. 3, an electrode, such as electrode 20, manufactured in accordance with the present invention, is schematically illustrated and exemplifies the present teachings.

More particularly, electrode 20 comprises a mechanically strong porous plaque 30 which is preferably formed of sintered nickel. Plaque 30, is as shall herein be described in greater detail, especially provided with an active catalytic concentration 31.

It is the manner in which concentration 31 is formed which provides an important aspect of this invention.

A method for creating catalytic concentration 31 upon the electrode plaque 30 shall now be described.

First, an electrode plaque formed, in this instance, of sintered nickel is selected. The plaque will normally have a thickness of approximately 1/32 to about 3/8 inch although electrodes of 0.005 inch work satisfactorily. Little electrical difference is found to exist between a 1/32 inch thick and a 1/4 inch thick plaque. Other factors such as cost, weight and overall size of the ultimate unit favor a thinner plaque. The faces of the plaque will generally be rectangular and have any desired dimensions. Other surface shapes can also be employed as desired.

As a matter of good practice, it is generally desirable to make sure the plaque is clean before processing it further. One suitable technique for cleaning a contaminated plaque comprises dipping the plaque into a bath containing a suitable solvent such, for example, as thichloroethylene, boiling the bath while the plaque remains therein, and thereafter boiling the plaque in water and rinsing each plaque to remove any residual matter therefrom. A cold water rinse is satisfactory provided the water does not introduce new contaminants onto the surface of the plaque.

After the plaque has been determined to be clean, either initially or after further cleaning, it is then treated strategically with a unique sequence of catalyst containing formulations as shall now be described.

It should first be stated that the term "catalyst" as used herein refers to those elements and reagents characterized by the propensity to promote the fuel-oxidant reaction previously described without entering thereinto. Several materials have been discerned to possess the required catalytic properties in varying degrees. Of these materials, the so-called "platinum metals" are probably the most effective. "Platinum metals," as used herein, include the elements: platinum, palladium, iridium, osmium, rhodium and ruthenium of which platinum and palladium will be hereafter described to exemplify the group.

The clean plaque is first immersed into an ambient temperature bath containing about one to three percent palladium black, as a chloride salt, in a suitable acid such, for example, as hydrochloric acid. The bath preferably has a pH value of less than 0.1, that is, it is highly acidic.

The plaque is maintained in the bath while the temperature of the bath is gradually increased but not above an etch depressing temperature of about 50° C. The palladium from the bath forms on the plaque, adhering initially to the more pronounced protrusions therefrom termed primary active centers, while the bath, which was originally a brownish color, changes color to a very light yellow-green. The color change results from the chemical displacement of nickel from the plaque by palladium from the bath. The displaced nickel, now in the bath, forms nickel chloride which is characterized by a light yellowish-green color. This color change provides a very easy and accurate signal for the completion of the displacement reaction.

When the color of the bath changes from brown to yellow-green to indicate that essentially all of the palladium is gone from the bath, the bath is then heated to a temperature of about 50° C.–80° C. to accelerate the attack of the acid of the bath upon the exposed, i.e., non-catalyzed portions of the plaque. The action of the acid upon these exposed nickel portions is an etching action which creates secondary active centers on the plaque surface.

The term "active centers," as used herein, refers to those protrusions (see FIG. 7) from the norm of the superficial surface of the crystals making up the electrode plaque upon which catalyst may be deployed, generally in a point having two or more sides, to provide a greater catalytic surface for exposure to the reactive gases and thereby enhance the activity of the gases as they come into contact therewith.

Those active centers which are present on the plaque prior to any deposition of catalyst are termed primary active centers. Those active centers which are created by the acid etching action after the primary application of catalyst are termed secondary active centers. Those active centers which are created by the acid etching action after the secondary application of catalyst are termed tertiary active centers. Catalyst applied to the tertiary active centers is termed the tertiary origin catalyst. After the tertiary application of catalyst, little further improvement can be obtained through the etching of quaternary active centers and deposition of catalyst thereon.

The plaque can be withdrawn from the bath when the color of the bath becomes a darker green than the yellow-green originally detected to indicate that the desired action of the acid has occurred.

The plaque, after having one application of catalyst applied thereto and being etched in the manner described, is then immersed into at least a second bath which, at ambient temperatures, contains about one to three percent palladium black, as a chloride salt, in a suitable acid such, for example, as hydrochloric acid. The bath is also preferably provided with a pH of less than 0.1, that is, it is highly acidic.

The plaque is maintained in this bath while the temperature of the bath is gradually increased to 30° C.–50° C. The palladium from the bath begins to form on the plaque, being drawn by the secondary active centers thereon previously provided by the preceding etch. In the meantime, the bath, which originally possessed a brownish color, changes to a light yellowish-green color. The color change again is the result of the chemical displacement of nickel from the plaque into the bath where the nickel forms nickel chloride which, as is known, is characterized by a light yellowish-green color.

When the color of the bath changes from brown to yellow-green, indicating that substantially all the palladium chloride is now gone from the bath, the bath is heated to a temperature of 50° C.–80° C. to accelerate the etching effect of the acid of the bath upon the remaining exposed portions of the nickel plaque. The action of the acid upon the exposed nickel creates tertiary active centers.

When the bath acquires a darker green color than the yellow-green detected at the beginning of the etching period, the plaque can be withdrawn from the bath and rinsed as before.

The plaque, now carrying primary and secondary applications of catalyst, and freshly etched in the manner described, may be next immersed into a third bath, likewise at ambient temperatures. This bath, likewise, contains about one to three percent palladium black, as a salt, in a suitable acid such, for example, as hydrochloric acid. The bath is also preferably highly acidic.

The plaque is maintained in this bath while the temperature of the bath is gradually increased to about 50° C. to enhance the rate of chemical deposition of palladium onto the plaque. The palladium forms on the plaque at the tertiary active centers provided thereupon by the preceding etch and, as the palladium deposits upon the plaque, the bath again changes color to a yellow-green which indicates clearly and accurately that a nickel chloride salt is formed in the bath.

Upon noting this color change, the bath is then heated, if a further catalytic application is desired, to a temperature of about 65° C. to enhance the etching action in the manner previously described.

If, however, the size of the electrode and the particular characteristics desired indicate three applications to be sufficient, the bath need not be heated further. Rather, the plaque may be removed from the bath, suitably rinsed, as with distilled water, dried and is ready to use.

If the fourth application is desired, the plaque will be treated as before.

If it is desired to catalyze the electrode plaque with platinum, instead of the palladium employed in the foregoing description, the method to be followed is substantially identical with the described method except that the several baths will be formulated to contain a one to three percent solution of platinum black, say as platinic chloride, in a suitable acid such, for example, as hydrochloric acid.

Thus, a bath consisting of a 1.9 percent solution of platinic chloride and having a pH of about 0.1 (chloroplatinic acid) is found to produce excellent electrodes as shall hereinafter appear.

For most electrodes employed in fuel cells today, three catalytic applications, from baths each containing from about five to about ten milligrams of the catalyst per square inch of electrode surface area, will produce quite satisfactory results. It is, of course, understood that the exact formulation of the several baths will vary for electrode plaques of different surface areas, the exact amount of catalyst in solution being determinable by well known stoichiometric calculations which require no elaboration here.

It should be noted that when the platinum baths are used, the convenient but quite accurate color signal described above still occurs but the color change is from the golden color of the platinic chloride to the yellow-green of nickel chloride.

Similar color changes having equal accuracy occur when original baths containing iridium chloride (brownish-black), osmium chloride (dark brown), rhodium chloride (reddish-brown) and ruthenium chloride (colorless) are used because as the application nears completion, the above indicated characterizing colors will change to the predominant yellowish-green of nickel chloride.

The foregoing process thus illustrates, among other things, a major contribution to the art, namely, that decided and unexpected properties are provided in the operation of fuel cells and like electrical apparatus when the electrodes are manufactured by treating the electrode with a plurality of applications of catalyst thereto from a bath which synergistically coacts with the plaque to further etch uncatalyzed portions of the plaque, without disturbing the catalyzed portions thereof, to create new active centers for the subsequent application of catalyst.

Data rigorously supporting the foregoing has been accumulated and is set forth in subsequent tables.

Thus, Table I sets forth the results of operating a fuel cell of the type shown in the drawing with a porous nickel plaque which has been catalyzed with platinum in accordance with the present invention. All of the electrodes were given catalytic concentrations on both faces, each of which measured one inch square in area.

*Table I*

| Wt. of Catalyst Applied (gms.) | No. of Appl. | Current Density (Amps/ft.²) | Voltage (Volts) |
|---|---|---|---|
| 0.038 | 2 | 14.0 | 0.7 |
| 0.057 | 3 | 18.0 | 0.7 |
| 0.076 | 4 | 29.0 | 0.7 |

These results are in contrast to the results (set forth in Table II) where identical plaques were given substantially identical amounts of catalyst in a single application.

*Table II*

| Wt. of Catalyst Applied (gms.) | Current Density (Amps/ft.²) | Voltage (Volts) |
|---|---|---|
| 0.019 | 7.2 | 0.7 |
| 0.030 | 11.5 | 0.7 |
| 0.045 | 11.6 | 0.7 |
| 0.060 | 11.5 | 0.7 |
| 0.075 | 11.6 | 0.7 |

A similar contrast resulted when the electrode plaque was catalyzed with palladium. Thus, Table III sets forth the results of operating a fuel cell with porous nickel plaques prepared in accordance with the present invention.

*Table III*

| Wt. of Catalyst Applied (gms.) | No. of Appl. | Current Density (Amps/ft.²) | Voltage (Volts) |
|---|---|---|---|
| 0.044 | 2 | 15.0 | 0.7 |
| 0.066 | 3 | 22.0 | 0.7 |

These results are likewise in decided contrast to the results (set forth in Table IV) where identical plaques were given substantially identical amounts of palladium by a single application.

*Table IV*

| Wt. of Catalyst Applied (gms.) | Current Density (Amps/ft.²) | Voltage (Volts) |
|---|---|---|
| 0.022 | 10.0 | 0.7 |
| 0.030 | 10.2 | 0.7 |
| 0.045 | 10.2 | 0.7 |
| 0.060 | 10.2 | 0.7 |
| 0.075 | 11.5 | 0.7 |

The plaques used in these several experiments are composed of fine powdered nickel which is pressed over a nickel screen and sintered in a furnace at approximately 1200° C. The plaque is approximately 80 percent porous, semi-flexible, and the nickel crystals are dendritic in shape with triangular faces. The plaques, as previously indicated, are formed into several standard thicknesses, viz., 0.028, 0.060, 0.095 and 0.125 inch thick.

Further experimental data indicates that, regardless of plaque thickness, the optimum electrode current density is usually reached after three catalytic applications. This data is set forth in Table V.

*Table V*

| No. of Appl. | Wt. of Catalyst Applied (gms.) | Plaque Thickness (Inches) | Current Density (Amp/ft.²) | Voltage (Volts) |
|---|---|---|---|---|
| 1 | 0.019 | 0.125 | 7.2 | 0.7 |
| 2 | 0.038 | 0.125 | 14.4 | 0.7 |
| 3 | 0.057 | 0.125 | 25.2 | 0.7 |
| 4 | 0.076 | 0.125 | 28.8 | 0.7 |
| 5 | 0.095 | 0.125 | 28.8 | 0.75 |
| 1 | 0.019 | 0.060 | 7.2 | 0.7 |
| 2 | 0.038 | 0.060 | 14.4 | 0.7 |
| 3 | 0.057 | 0.060 | 21.6 | 0.7 |
| 4 | 0.076 | 0.060 | 28.8 | 0.7 |
| 1 | 0.019 | 0.028 | 10.0 | 0.7 |
| 2 | 0.038 | 0.028 | 14.4 | 0.7 |
| 3 | 0.057 | 0.028 | 28.8 | 0.7 |

It has further been demonstrated, and is set forth in Table VI, that maximum current efficiency per unit catalyst used is obtained when the catalysts are applied according to the sequence of the present invention.

Table VI

| No. of Appl. | Wt. of Catalyst Applied (gms.) | Plaque Thickness (Inches) | Current Density (Amp/ft.²) | Voltage (Volts) |
|---|---|---|---|---|
| 1 | 0.060 | 0.028 | 11.5 | 0.7 |
| 3 | 0.057 | 0.028 | 28.8 | 0.7 |
| 1 | 0.075 | 0.028 | 13.0 | 0.7 |
| 4 | 0.076 | 0.028 | 28.8 | 0.7 |

A more complete appreciation of the electrode thus produced can be obtained from a consideration of FIGS. 4, 5, 6 and 7.

Figure 4:
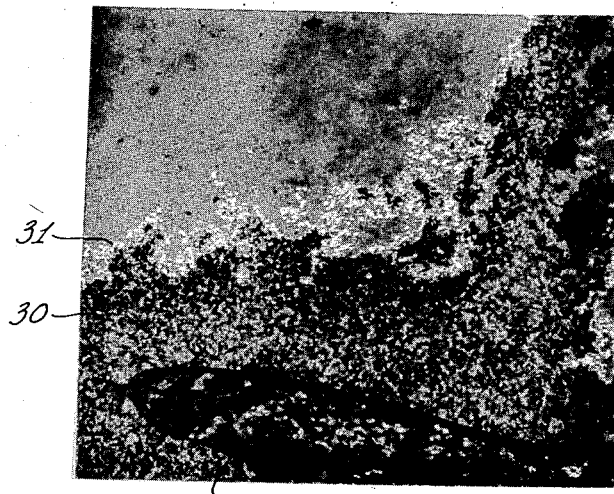
FIG. 4 is a photomicrograph ($\times 100$) of one edge of a beveled cut across an electrode plaque embodying the present invention.
Figure 5:
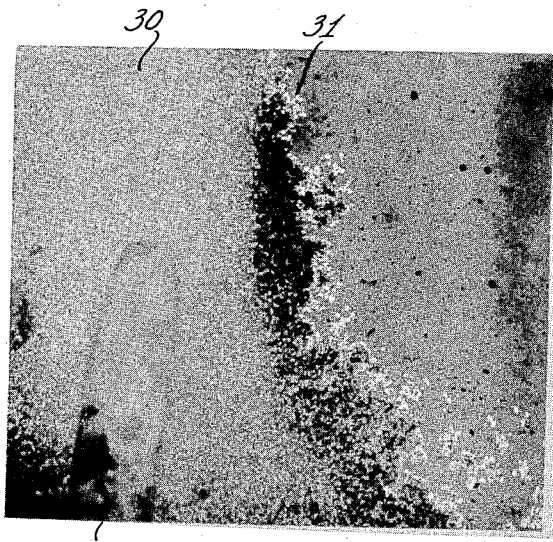
FIG. 5 is a photomicrograph ($\times 100$) of another edge of the beveled cut of the electrode plaque of FIG. 4.
Figure 6:
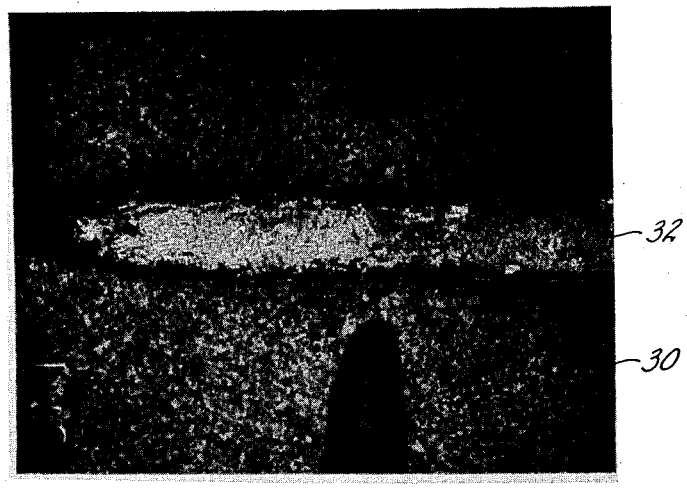
FIG. 6 is a photomicrograph ($\times 100$) of the beveled cut across the electrode plaque of FIGS. 4 and 5, intermediate the edges therein shown.

FIGS. 4, 5 and 6 are photomicrographs of an electrode prepared in accordance with the present invention and clearly illustrate the propensity of the invention to maintain maximum catalyst at the situs of maximum utility, that is, at or adjacent the surface of the electrode plaque.

The finished electrode was given a beveled cut, etched with a solution containing 720 cc. of water, 180 cc. of concentrated HCl and 60 grams of $FeCl_3$.

FIG. 4, taken at 100× magnification adjacent one edge of the beveled cut, shows the plaque 30, the catalyst concentration 31, and wire 32 (upon which the plaque is constructed as previously described). The catalyst concentration 31 is significantly at or near the surface of the plaque.

FIG. 5, also taken at 100× magnification adjacent the other edge of the beveled cut, likewise shows the intense catalytic concentration 31 at or near the surface of plaque 30.

FIG. 6, likewise 100× magnification, was taken of the surface of the beveled cut intermediate the edges shown in FIG. 4 and FIG. 5, and is especially significant in that it shows substantially no catalyst has migrated to the interior of the plaque.

Photomicrographs (not shown) of like electrodes having similar amounts of catalyst disposed thereon in a single application revealed that the catalyst, under those conditions, has a great tendency to migrate into the plaque, especially along the wires with the net result that it removes itself from an operative region of the plaque for utility in fuel cell operation.

Figure 7:
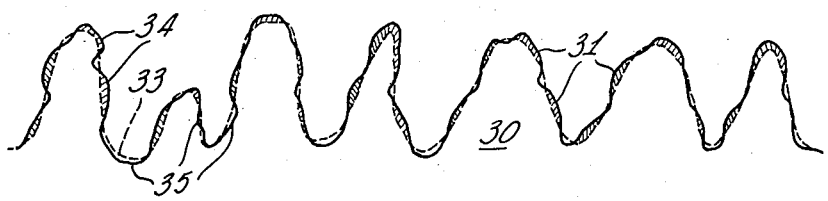
FIG. 7 is a sketch of an enlarged segment of a face of an electrode plaque to illustrate an accepted thesis of the present invention.

The thesis of the mechanism of the several applications of the present invention is schematically illustrated in FIG. 7 which shows, fragmentarily, the plaque 30 and the catalyst concentration 31 between immersions so that discrimination between catalyzed and uncatalyzed portions can be obtained.

It will be noted that the original surface contour 33 (shown in phantom) of the plaque 30 undergoes a change as the primary catalyst concentrations 31 form and the etching action takes place to create new secondary active centers 35.

The surface of plaque 30, after the immersion, is shown in bold line identified as 34.

Subsequent immersions will apply additional catalytic concentrations to the plaque especially in the active centers while new active centers will be created in portions of the plaque surface to which no catalyst has yet adhered.

Thus, the contour of the plaque surface changes throughout the several applications to intimately provide an electrode having maximum catalyst concentration at the sight of maximum utility.

Thus, a new method of preparing fuel cell electrodes and the like has been described which fullfills the aforestated objectives in a remarkably unexpected fashion and decidedly advances the progress of science in its field. It is understood that the technique herein described for creating an active catalytic electrode may be suitably applied to other articles and particles upon which such a catalytic surface is desired.

It is, of course, further understood that the several examples and embodiments herein described and illustrated are intended to exemplify the present invention rather than limit it and it is intended that such modifications, alterations and applications as shall occur to one skilled in this art when confronted by this disclosure shall be embraced within the spirit hereof, especially as that spirit is defined by the claims appended hereto.

What is claimed is:

1. The method of making an electrode for use with fuel cells and like apparatus comprising: immersing a porous nickel plaque having primary origin active centers into a first highly acid solution containing from about one to about three percent of a soluble salt of an element selected from the group consisting of platinum, palladium, iridium, rhodium, osmium, and ruthenium, said solution being of a color distinguishable from green; heating to and maintaining said solution at an etch depressing temperature of about 30° C.–50° C. until said element deposits intermittently upon said primary active centers of said immersed plaque as indicated by the color of said solution becoming yellowish-green; subsequent to primary deposition further heating said yellowish-green solution to an etch promoting temperature of about 50° C.–80° C. to cause said solution to etch secondary active centers into portions of said plaque other than said primary active centers upon which said element is deposited until said yellowish-green solution becomes a green solution; removing said plaque from said green solution; rinsing said plaque; immersing said plaque into a second highly acid solution containing from about one to about three percent of said salt of said element selected from said first solution, said second solution likewise having said distinguishable color; heating to and maintaining said solution at an etch depressing temperature of about 30° C.–50° C. as said element deposits intermittently upon said secondary active centers, intermediate said primary deposits until the color of said solution becomes yellowish-green; subsequent to secondary deposition further heating said yellowish-green solution to an etch promoting temperature of about 50° C.–80° C. while said solution etches tertiary active centers into said plaque until said yellowish-green solution becomes a green solution; removing said plaque from said green solution; rinsing said plaque; immersing said plaque into a third highly acid solution containing from about one to three percent said salt of said element selected from said first solution and being of a color distinguishable from green; heating to and maintaining said solution at an etch depressing temperature of about 30° C.–50° C. as said element deposits upon said newly formed tertiary active centers intermediate former primary and secondary deposits of said element, until the color of said solution becomes yellowish-green; removing said plaque from said yellowish-green solution; and rinsing said plaque.

2. The method according to claim 1 wherein said acid solution contains hydrochloric acid having a pH of about 0.1 with said soluble salt being a chloride salt of an element selected from said group.

3. The method according to claim 1 wherein said first solution contains sufficient active palladium ions to provide from about two to not more than about five milligrams of palladium for each square inch of superficial plaque surface area; each solution subsequent to said first solution containing sufficient active palladium ions to provide not more than about ten milligrams of palladium per square inch of superficial plaque area.

4. A method according to claim 1 wherein said first solution contains sufficient active platinum ions to provide not more than about five milligrams of platinum for each square inch of superficial plaque surface area; each solution subsequent to said first solution containing sufficient active platinum ions to provide not more than about ten milligrams of platinum per square inch of superficial plaque area.

5. The method of making an electrode for use with fuel cells and like apparatus comprising: immersing a porous nickel plaque having primary origin active centers into a first highly acid solution containing from about one to about three percent of a soluble salt of an element selected from the group consisting of platinum, palladium, iridium, rhodium, osmium and ruthenium, said solution being of a color distinguishable from green; heating to and maintaining said solution at an etch depressing temperature as deposition of said element upon primary active centers is completed until the color of said solution becomes yellowish-green; subsequent to completion of primary deposition further heating said yellowish-green solution to an etch promoting temperature to cause said solution to etch secondary active centers into portions of said plaque other than said primary active centers upon which said element is deposited until said yellowish-green solution becomes a green solution; removing said plaque from said solution; rinsing said plaque; immersing said plaque into a second highly acid solution containing from about one to about three percent of said salt of said element selected for said first solution, said second solution likewise having said distinguishable color; heating to and maintaining said solution at an etch depressing temperature as deposition of said element upon the newly formed secondary active centers is completed until the color of said solution becomes yellowish-green; removing said plaque from said yellowish-green solution; and rinsing said plaque.

References Cited in the file of this patent

UNITED STATES PATENTS

| | | |
|---|---|---|
| 2,690,402 | Crehan | Sept. 28, 1954 |
| 2,872,352 | Porter et al. | Feb. 3, 1959 |